United States Patent
O'Connor et al.

(10) Patent No.: US 7,598,202 B2
(45) Date of Patent: *Oct. 6, 2009

(54) USE OF CATIONIC LAYERED MATERIALS, COMPOSITIONS COMPRISING THESE MATERIALS, AND THE PREPARATION OF CATIONIC LAYERED MATERIALS

(75) Inventors: Paul O'Connor, Hoevelaken (NL); William Jones, Cambridge (GB); Dennis Stamires, Newport Beach, CA (US)

(73) Assignee: Albemarle Netherlands B.V., Amsterdam (NL)

( * ) Notice: Subject to any disclaimer, the term of this patent is extended or adjusted under 35 U.S.C. 154(b) by 661 days.

This patent is subject to a terminal disclaimer.

(21) Appl. No.: 11/313,837

(22) Filed: Dec. 20, 2005

(65) Prior Publication Data

US 2006/0194692 A1    Aug. 31, 2006

Related U.S. Application Data

(63) Continuation-in-part of application No. 10/602,803, filed on Jun. 24, 2003, now Pat. No. 7,025,873.

(51) Int. Cl.
*B01J 29/06*    (2006.01)

(52) U.S. Cl. .............. 502/300; 502/80; 502/84; 502/355; 208/113; 208/118; 208/120.01; 208/120.25; 208/122; 208/143; 208/213; 208/254 H; 208/306; 208/950

(58) Field of Classification Search .............. 502/80, 502/84, 300, 355; 208/118, 120.01, 120.25, 208/113, 122, 143, 213, 254 H, 306, 950
See application file for complete search history.

(56) References Cited

U.S. PATENT DOCUMENTS

| | | | | |
|---|---|---|---|---|
| 6,156,695 | A * | 12/2000 | Soled et al. ............. | 502/305 |
| 6,162,350 | A * | 12/2000 | Soled et al. ............. | 208/113 |
| 6,716,785 | B2 * | 4/2004 | Stamires et al. ......... | 502/84 |
| 7,025,873 | B2 * | 4/2006 | O'Connor et al. ....... | 208/120.25 |

* cited by examiner

*Primary Examiner*—David M Brunsman
(74) *Attorney, Agent, or Firm*—James A. Jubinsky

(57) ABSTRACT

Novel compositions of matter comprising a cationic layered material and a second compound. The second compound has a reflection in its XRD pattern at 18.5 degrees two-theta, and s second reflection at 29 degrees two-theta. The composition of matter may be used in hydrocarbon conversion, purification, and synthesis processes, such as fluid catalytic cracking and hydroprocessing. The materials are especially suitable for the reduction of SOx and NOx emissions and the reduction of the sulfur and nitrogen content in fuels like gasoline and diesel.

11 Claims, 7 Drawing Sheets

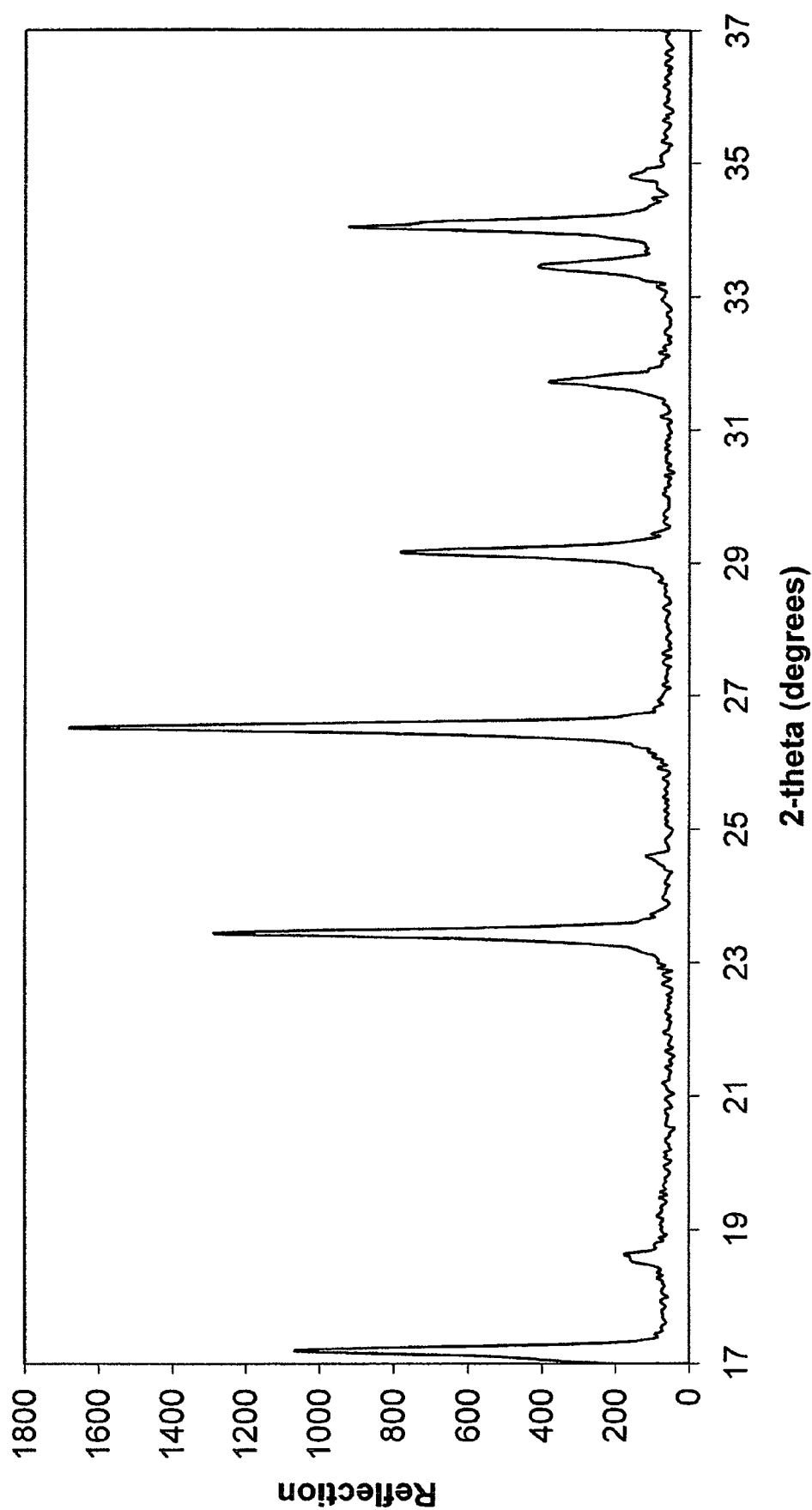

USE OF CATIONIC LAYERED MATERIALS, COMPOSITIONS COMPRISING THESE MATERIALS, AND THE PREPARATION OF CATIONIC LAYERED MATERIALS

REFERENCE TO RELATED APPLICATION

This is a continuation-in-part of application Ser. No. 10/602,803 to O'Connor et al, filed Jun. 24, 2003, now U.S. Pat. No. 7,025,873.

BACKGROUND OF THE INVENTION

This invention relates to a new use of cationic layered materials, compositions comprising these materials, and a process for the preparation of cationic layered materials.

A Cationic Layered Material (CLM) is a crystalline $NH_4$-Me(II)-TM-O phase with a characteristic X-ray diffraction pattern. In this structure, Me(II) represents a divalent metal and TM stands for a transition metal. The structure of a CLM consists of negatively charged layers of divalent metal octahedral and transition metal tetrahedral with charge-compensating cations sandwiched between these layers.

The CLM structure is related to that of hydrotalcite and hydrotalcite-like materials. These materials, also referred to by the skilled person as layered double hydroxides (LDH) or anionic clays, are built up of Me(II)-Al hydroxide sheets with exchangeable anions in the interlayer. Analogous to the term "anionic clay" being a synonym for hydrotalcites and hydrotalcite-like materials, "cationic clay" can be used as a synonym for CLM.

CLMs are known from the prior art. M. P. Astier et al. (*Ann. Chim. Fr.* Vol. 12, 1987, pp. 337-343) prepare CLMs by first dissolving ammonium heptamolybdate and nickel nitrate in an aqueous ammonia solution and subsequently altering the pH by evaporating ammonia, resulting in precipitation. After aging, washing, and drying, pure crystalline CLMs are formed with a characteristic X-ray diffraction pattern.

A similar precipitation procedure is disclosed in U.S. Pat. No. 6,156,695 for the preparation of CLMs containing Ni, W, and Mo. D. Levin, S. Soled, and J. Ying (*Chem. Mater.* Vol. 8, 1996, pp. 836-843; *ACS Symp. Ser.* Vol. 622, 1996, pp. 237-249; *Stud Surf, Sci. Catal.* Vol. 118, 1998, pp. 359-367) also disclose the preparation of CLMs. Their process involves the steps of (a) precipitating a divalent metal salt and aluminium nitrate, (b) aging the precipitate to form an anionic clay, (c) calcining the anionic clay to form a mixed oxide, and (d) contacting and reacting the mixed oxide with ammonium heptamolybdate—thereby removing aluminium ions and incorporating molybdate ions—resulting in a CLM with a trace amount, e.g. 0.63 wt %, of aluminium.

It has now been found that CLMs can suitably be used in or as a catalyst or catalyst additive in a hydrocarbon conversion, purification, or synthesis process, particularly in the oil refining industry and Fischer-Tropsch processes. Examples of processes where CLMs can suitably be used are catalytic cracking, hydrogenation, dehydrogenation, hydrocracking, hydroprocessing (hydrodenitrogenation, hydrodesulfurisation, hydrodemetallisation), polymerisation, steam reforming, base-catalyzed reactions, Fischer-Tropsch, and the reduction of SOx and NOx emissions. They are especially suitable for use in FCC processes, particularly as active material in FCC catalysts or catalyst additives for (i) the reduction of the nitrogen and/or sulfur content of fuels like gasoline and/or diesel and/or (ii) the reduction of SOx and/or NOx emissions.

Therefore, the invention relates to the use of a cationic layered material in a hydrocarbon conversion, purification, or synthesis process. This cationic layered material may have been prepared according to the process of the invention described below, or according to any other process, e.g. the prior art processes mentioned above.

The prior art processes for preparing CLMs all use water-soluble divalent metal and aluminium salts as starting material, which is particularly disadvantageous. First of all, these soluble metal salts are relatively expensive. Second, they require a precipitation process, which is not very attractive to perform on an industrial scale, because it involves repeated filtering and washing steps of very fine (colloidal type) particles. This involves large-scale plant equipment, very low throughput capacities, and large volumes of contaminated waste water. Third, the use of salts implies the use of anions. These anions either have to be removed by washing and filtering steps—incurring the above filtration problems with the fine-particled materials and waste water streams containing, e.g., nitrates, sulphates, halogens, etc.—or will be emitted as environmentally harmful gases like nitrogen oxides, halogens, sulphur oxides, etc. during the drying or calcination steps.

The present invention also provides a process for the production of cationic layered materials using inexpensive raw materials. In particular, the use of metal salts is avoided, resulting in a process that is particularly environmentally friendly and more suited to the environmental constraints that are increasingly imposed on commercial operations. Furthermore, this process does not involve a precipitation process. In addition, in one process embodiment there is no necessity of forming an anionic clay as intermediate, thereby simplifying the process.

DETAILED DESCRIPTION OF THE INVENTION

In one embodiment the invention relates to a process comprising the steps of:
a) preparing a slurry comprising a water-insoluble aluminium source and a divalent metal source,
b) drying the slurry of step a) and calcining the dried material to form a first calcined material,
c) optionally rehydrating the product of step b) to obtain an anionic clay, followed by calcining the anionic clay to form a second calcined material,
d) contacting a slurry of either the first or the second calcined material with an ammonium transition metal salt,
e) aging the resulting slurry.

This process can include additional steps, for instance an intermediate drying step, a shaping step, a milling step, an additional aging step, an additional calcination step, or washing and filtering steps. Moreover, additional compounds like acids, bases, or metal compounds can be added where appropriate.

In a first process embodiment step c) is not performed, meaning that the product of step b) is contacted with the ammonium transition metal salt, i.e. step d). In this embodiment anionic clay is not formed as an intermediate, although a small amount might be formed during step a). In a second process embodiment anionic clay is formed as intermediate product by rehydrating the material resulting from step b).

During aging step e), aluminium is removed from the intermediate material. If the material is filtered and washed after step e) and if the aging conditions are such that the removed aluminium does not become insoluble, this aluminium will not end up in the final product. However, if no washing step is applied and/or if insoluble aluminium compounds are formed during aging, aluminium will end up in the final composition as a separate aluminium-containing compound, such as an aluminium oxide or hydroxide, a metal aluminate, or aluminium molybdate. As will be explained below, the presence of this separate aluminium-containing compound may have several advantages. The invention, therefore, also relates to compositions comprising CLM and aluminium oxide or hydroxide, metal aluminate, or aluminium molybdate as such.

The invention further relates to a material comprising a cationic layered material (CLM) phase, and an additional phase. The additional phase has, in its XRD pattern, a first peak at about 18.5 degrees two-theta, and a second peak at about 29 degrees two-theta. References are to the XRD pattern obtained with Cu $K_\alpha$ radiation.

The additional phase of the material of the present invention (also referred to as the "second compound") is in many cases an aluminium-containing compound. Preferred compositions comprise from about 1 to about 50 wt % of the second compound, more preferably from about 5 to about 50 wt %.

Water-Insoluble Aluminium Source

The water-insoluble aluminium source that can be used in the process of the invention includes aluminium oxides and hydroxides, such as gel alumina, boehmite, pseudoboehmite (either peptised or not), aluminium trihydrates, thermally treated aluminium trihydrates, and mixtures thereof. Examples of aluminium trihydrates are crystalline aluminium trihydrate (ATH), for example gibbsites provided by Reynolds Aluminium Company RH-20® or J M Huber Micral® grades, BOC (Bauxite Ore Concentrate), bayerite, and nordstrandite. BOC is the cheapest water-insoluble aluminium source.

The water-insoluble aluminium source preferably has a small particle size, preferably below 10 microns.

Calcined aluminium trihydrate is readily obtained by thermally treating aluminium trihydrate (gibbsite) at a temperature ranging from 100° to 1,000° C. for 15 minutes to 24 hours. In any event, the calcining temperature and the time for obtaining calcined aluminium trihydrate should be sufficient to cause a measurable increase of the surface area compared to the surface area of the gibbsite as produced by the Bayer process, which is generally between 30 and 50 $m^2/g$. Within the context of this invention flash calcined alumina (e.g. Alcoa CP® alumina) is also considered to be a thermally treated form of aluminium trihydrate. Flash calcined alumina is obtained by treating aluminium trihydrate at temperatures between 800° and 1,000° C. for very short periods of time in special industrial equipment, as is described in U.S. Pat. No. 4,051,072 and U.S. Pat. No. 3,222,129.

The water-insoluble aluminium source may have been doped with metal compounds, for instance rare earth metals or transition metals. Examples are compounds of, for instance, Ce, La, V, Mg, Ni, Mo, W, Mn, Fe, Nb, Ga, Si, P, Bi, B, Ti, Zr, Cr, Zn, Cu, Co, and combinations thereof, preferably in amounts between 1 and 40 wt %. The desired metal depends on the application of the final product. For example, for hydroprocessing applications Mo, Co, Ni, W are preferred, while for FCC applications preference is given to V, Ce, La, Ni, Zn, Fe, Cu, W, Mo. This doped water-insoluble aluminium source can be obtained by any method known in the art, for instance thermal or hydrothermal treatment of a water-insoluble aluminium source with a compound of the desired metal. Preferably oxides, hydroxides, and carbonates of these metals are used, but also nitrates, chlorides, sulphates, phosphates, acetates, and oxalates can be used. When a doped water-insoluble aluminium source is used as a starting material for the preparation of compositions comprising CLM and aluminium oxide or hydroxide, doped aluminium oxide or hydroxide (in a controlled amount) will be present in the final product. This may be beneficial for several applications.

Divalent Metal Source

Suitable divalent metal sources to be used in the process of the invention are compounds containing $Zn^{2+}$, $Mn^{2+}$, $Co^{2+}$, $Ni^{2+}$, $Cu^{2+}$, $Fe^{2+}$, $Ca^{2+}$, $Ba^{2+}$, and mixtures of said compounds. Both solid divalent metal sources and soluble divalent metal sources (e.g. nitrates, chlorides, acetates, etc.) are suitable. Preferably oxides, hydroxides, carbonates, hydroxycarbonates, formates, or acetates are used. Combinations of divalent metal sources may be used as well.

The divalent metal source may have been doped with metals, such as Al, Ga, Cr, Fe, V, B, In, Nb, W, Mo, Ta, or mixtures thereof. This doped divalent metal source can be obtained by any method known in the art, for instance thermal or hydrothermal treatment of a divalent metal source with a compound of the desired metal. Preferably oxides, hydroxides, and carbonates of these metals are used, but also nitrates, chlorides, sulphates, phosphates, acetates, and oxalates can be used.

Ammonium Transition Metal Salt

The ammonium transition metal salt is preferably selected from the group of ammonium heptamolybdate, ammonium tungstate, ammonium vanadate, ammonium dichromate, ammonium titanate, and ammonium zirconate. Combinations of these compounds may also be used.

Process Conditions

The process can be conducted in either batch or continuous mode, optionally in a continuous multi-step operation. The process can also be conducted partly batch-wise and partly continuously.

The water-insoluble aluminium source and the divalent metal source are added to a reactor and slurried in water. The reactor can be heated by any heating source such as a furnace, microwave, infrared sources, heating jackets (either electrical or with a heating fluid), lamps, etc. The reactor may be equipped with stirrers, baffles, etc., to ensure homogeneous mixing of the reactants. The aqueous suspension in the reactor can be obtained by combining water, the divalent metal source, and the water-insoluble aluminium source either per se, as slurries, or combinations thereof. Additionally, in the case of a water-soluble divalent metal source, the divalent metal source can be added as a solution. Any sequence of addition can be used: the divalent metal source can be added to a slurry of the water-insoluble aluminium source, the water-insoluble aluminium source can be added to a slurry or solution of the divalent metal source, or the water-insoluble aluminium source and the divalent metal source can be added to the reactor at the same time.

Optionally, the resulting mixture and/or the separate sources are homogenised by, for instance, milling, high shear mixing or kneading. Especially when using metal sources like oxides, hydroxides or carbonates, it is usually advisable to mill the metal sources. Preferably, both the water-insoluble aluminium source and the divalent metal source—if water-insoluble—are milled. Even more preferably, a slurry comprising both the water-insoluble aluminium source and the divalent metal source is milled.

If desired, organic or inorganic acids and bases, for example for control of the pH, may be fed to the reactor or added to either the divalent metal source or the water-insoluble aluminium source before they are fed to the reactor. A preferred pH modifier is an ammonium base, because upon drying no deleterious cations remain in the product.

The use of alkali metal-containing compounds is preferably avoided, as the presence of alkali metals is undesired for several (catalytic) applications.

Optionally, the mixture may be aged after step a). This aging can be performed under, or close to, ambient conditions, or under thermal or hydrothermal conditions. Within the context of this description hydrothermal means in the presence of water (or steam) at a temperature above 100° C. at elevated pressure, e.g. autogenous pressure. The aging temperature can range from 20°-400° C. A preferred temperature range is 60-175° C. Suitable atmospheres comprise $CO_2$, $N_2$, and air. The preferred atmosphere is air.

With this aging step it is possible, for instance, to convert the aluminium source into another aluminium source with improved binding properties. For instance, it is possible to convert aluminium trihydrate into boehmite.

This aging preferably does not result in the formation of large amounts of anionic clay, because before step b) it is preferred that less than 50 wt % is formed of the theoretically possible maximum amount of anionic clay that could be formed from the amounts of aluminium source and divalent metal source present in the slurry. More preferably, less than 30 wt %, more preferably less than 20 wt %, more preferably less than 10 wt %, and even more preferably less than 5 wt % of this amount is formed before step b). Most preferably, no anionic clay is present in the slurry before conducting step b).

The calcination according to step b) is conducted at temperatures between 175° and 1,000° C., preferably between 200° and 800° C., more preferably between 400° and 600° C., and most preferably around 450° C. This calcination is conducted for 15 minutes to 24 hours, preferably 1-12 hours, and most preferably 2-6 hours. The resulting material will be referred to as the first calcined material.

According to the second process embodiment, the first calcined material, after an optional milling step, is rehydrated in aqueous suspension to obtain an anionic clay. This rehydration can be performed at thermal or hydrothermal conditions and in the presence of dissolved metal salts, such salts including nitrates, carbonates, sulphates, oxalates of divalent (e.g. Zn, Mn, Co, Ni, Cu) or trivalent metals (e.g. Ga, Cr, Fe, V, Mo, W).

If rehydration is performed, the obtained anionic clay is subsequently calcined to obtain a second calcined material. This second calcination is performed at temperatures between 150° and 1,000° C., preferably between 200° and 800° C., more preferably between 200° and 600° C., and most preferably around 450° C. This calcination is conducted for 15 minutes to 24 hours, preferably 1-12 hours, and most preferably 2-6 hours.

A slurry of either the first (cf. the first process embodiment) or the second calcined material (cf. the second process embodiment) is subsequently contacted with the ammonium transition metal salt. To this end, a slurry of the calcined material, after an optional milling step, is added to a slurry or solution of the metal salt, or vice versa. It is also possible to treat the slurry of the calcined material at elevated temperature and then add the ammonium transition metal salt per se, or as a slurry or solution. Alternatively, an ammonium transition metal salt slurry or solution can be prepared by adding another transition metal compound, e.g. an oxide or hydroxide, to aqueous ammonia. If aqueous ammonia is present in the reactor, this slurry or solution can be prepared in situ by feeding the transition metal compound—as a solid, solution, or slurry—to the reactor.

The slurry is aged at temperatures of 20°-300° C., preferably 60°-200° C., for 15 minutes to 24 hours, preferably 1-12 hours, more preferably 2-6 hours, with or without stirring, at ambient or elevated temperature and at atmospheric or elevated pressure. Suitable atmospheres comprise $CO_2$, $N_2$, or air. The preferred atmosphere is air.

During this aging step, aluminium is removed from the material as dissolved species. A washing and filtering step may optionally be performed in order to prevent at least a portion of the aluminium from becoming part of the resulting product. The so-formed product will comprise predominantly CLM with an X-ray diffraction pattern analogous to that of the aforementioned CLMs obtained by Astier et al. By predominantly CLM is meant that the product will comprise more than 50% and preferably more than 70% CLM.

Compositions comprising CLM and an aluminium-containing compound are obtained if no washing and filtering step is performed and/or if insoluble aluminium compounds are formed during aging by changing the aging conditions, e.g. increasing the pH and/or the temperature. The types of aluminium-containing compounds will depend on the aging conditions. Examples of such aluminium-containing compounds are aluminium oxides, hydroxides, or salts, for instance boehmite, e.g. pseudo- or microcrystalline boehmite, bayerite, amorphous oxide or hydroxide, metal aluminate, or aluminium molybdate.

One aspect of the process resides in the presence of this aluminium-containing compound in the final product. The amount of aluminium-containing compound in these compositions can range from 1 to 50 wt %, and is preferably between 5 and 50 wt %. The aluminium-containing compound may serve as a binder, create porosity and a high surface area, and introduce acidic sites. The resulting compositions can, therefore, be advantageously used as absorbents or as catalyst additives or supports.

The aluminium-containing compound may be crystalline or amorphous, and have a high (>50 $m^2$) or low (<50 $m^2$) surface area, depending on the preparation conditions. For instance, aging at hydrothermal conditions with intermediate addition of base to increase the pH can result in compositions comprising CLM and microcrystalline boehmite; whereas aging at lower temperatures and pressures can result in compositions comprising CLM and quasi-crystalline boehmite, i.e. pseudo-boehmite.

In further embodiments the invention relates to compositions comprising CLM and a divalent metal compound (such as oxide or hydroxide), and to compositions comprising CLM and a transition metal compound.

Compositions comprising CLM and a divalent metal compound can be prepared using the above-described process by either starting with an excess of divalent metal source, or leaching out some of the divalent metal from the calcined product during aging. Examples of such compositions are compositions of CLM and ZnO, compositions of CLM and $Zn(OH)_2$, and compositions of CLM, ZnO, and (pseudo) boehmite. Compositions comprising CLM and a transition metal compound can be formed using the above-described process and taking an excess of ammonium transition metal salt.

The invention also relates to compositions comprising CLM and a compound containing a divalent metal, aluminium, and/or a transition metal. Examples or such compounds are Zn—Mo complexes, zinc aluminate, zinc aluminium molybdate, Zn—Al anionic clay, etc.

The CLMs or CLM-containing compositions used in accordance with the present invention will generally be in the form of shaped bodies. This shaping can be conducted either after or during the preparation of the CLM or the CLM-containing composition. For instance, in the above-described process the slurry of water-insoluble aluminium source and divalent metal source of step a) can be shaped before performing calcination step b), the anionic clay formed in step c) can be shaped before calcination, or the material can be shaped during aging step e) by performing this step in a kneader which might be heated.

Suitable shaping methods include spray-drying, pelletizing, extrusion (optionally combined with kneading), beading, or any other conventional shaping method used in the catalyst and absorbent fields or combinations thereof. The amount of liquid present in the slurry used for shaping should be adapted to the specific shaping step to be conducted. It might be advisable to (partially) remove the liquid used in the slurry and/or add an additional or another liquid, and/or change the pH of the precursor mixture to make the slurry gellable and thus suitable for shaping. Various additives commonly used in the various shaping methods, such as extrusion additives, may be added to the precursor mixture used for shaping. During this shaping step other components may be added to the slurry such as zeolites, clays, silicas, aluminas, phosphates, and other catalytically active materials known in the art.

For some applications it is desirable to have additives present in and/or on the CLMs or CLM-containing compositions. Suitable additives comprise oxides, hydroxides, borates, zirconates, aluminates, sulphides, carbonates, nitrates, phosphates, silicates, titanates, and halides of rare earth metals (for instance Ce, La), Si, P, B, Group VI, Group VIII noble metals (e.g. Pt, Pd), alkaline earth metals (for instance Mg, Ca and Ba), and transition metals (for example W, V, Mn, Fe, Ti, Zr, Cu, Co, Ni, Zn, Mo, Sn).

Said additives can easily be deposited on the CLMs or CLM-containing compositions. Alternatively, they can be added during the above-described process in any of its steps. The additives can for instance be added to the starting compounds, but can also be added separately in any of the slurries used in that process. Alternatively, the additives can be added just before the first or the second calcination step. Preferably, the slurry comprising the additive is milled.

If desired, the CLMs or the CLM-containing compositions may be subjected to ion-exchange. Upon ion-exchange the interlayer charge-balancing cations, i.e. $NH_4^+$, are replaced with other cations. Examples of suitable cations are $Na^+$, $K^+$, $Al^{3+}$, $Ni^{2+}$, $Cu^{2+}$, $Fe^{2+}$, $Co^{2+}$, $Zn^{2+}$, other transition metals, alkaline earth and rare earth metals, and pillaring cations such as $[Al_{13}]^{7+}$ Keggin ions. In the above-described process said ion-exchange can be conducted before or after drying the CLM or CLM-containing composition.

The present invention is further directed to catalyst compositions comprising CLMs and CLM-containing compositions per se, i.e., independent of their preparation method. Said catalyst compositions may comprise all components usually present in catalyst compositions, such as matrix and/or binder material, zeolites (e.g. faujasite, pentasil, and beta zeolites), additive components, and additional phases like metal oxides, sulfides, nitrides, phosphates, silica, alumina, (swellable) clay, anionic clays, pretovskites, titania, titania-alumina, zirconia, spinels, and silica-alumina. For specific purposes, such as hydroprocessing, the CLM may be pre-treated, e.g. sulfided.

In FCC catalyst compositions CLMs are especially suitable as active components for $SO_x$ and/or $NO_x$ removal, metal traps, and reduction of the N and/or S content in gasoline and diesel fuels.

CLM-containing catalyst compositions can be prepared by adding the other catalyst components to the CLMs or CLM-containing compositions before shaping them to form shaped bodies. Alternatively, the catalyst components can be mixed in a slurry with already formed (and subsequently milled) shaped bodies of CLMs or CLM-containing compositions. The resulting mixture can then be shaped again.

The CLMs and the CLM-containing compositions can also be combined with catalysts as additive compositions; as such or as shaped bodies. Therefore, the present invention is also directed to catalyst additive compositions comprising CLM. These additive compositions are especially suitable in FCC processes as active components for $SO_x$ and/or $NO_x$ removal, metal traps, and reduction of the N and/or S content in gasoline and diesel fuels, especially when metals such as Ce and/or V are present in or on the CLM.

The CLMs and CLM-containing compositions can be further calcined to form metal oxide compositions. Such a calcination can be performed at temperatures of 200°-1,000° C., preferably 400-600° C., and more preferably close to 450° C.

The metal oxide composition can be sulfided, reduced by hydrogen, CO, or other reducing agents, or otherwise treated to create an active catalyst composition which can suitably be used as a catalyst or catalyst additive for FCC, HPC, dehydrogenation, and Fisher-Tropsch processes. Sulfiding, for instance, is performed by contacting the metal oxide with a sulfur bearing compound, e.g. $H_2S$. The sulfur bearing compound can be passed over the metal oxide composition as a gas, or it can be present in a slurry comprising the metal oxide composition. Alternatively, the metal oxide composition can be rehydrated in aqueous solution and optionally in the presence of additives to form a CLM or CLM-containing composition, optionally containing an additive.

BRIEF DESCRIPTION OF THE FIGURES

FIG. 3a shows an expansion of the XRD pattern of FIG. 2a in the range of 17 to 37° 2-theta.

FIG. 1 will be discussed in more detail hereinbelow (see Example 18)

FIGS. 2a and 2b compare the XRD patterns of, respectively, a CLM and of a material according to the present invention. The material of the present invention (FIG. 2b) comprises a CLM, and the characteristic reflections of a CLM material are as a result present in its XRD pattern. In addition the material of the present invention comprises a second material having peaks in its XRD pattern at 18.5 degrees two-theta and at 29 degrees two-theta.

FIG. 3a is obtained by expanding the XRD patterns of FIG. 2a in the range of 17 to 37 degrees two-theta. FIG. 3b is obtained by expanding the XRD patterns of FIG. 2b in the range of 17 to 37 degrees two-theta. The XRD pattern of the material of the present invention (FIG. 3b) has additional reflections at 18.5 and 29 degrees two-theta.

FIG. 4 is the XRD pattern of boehmite. It is clear that the material formed in addition to CLM in the material of the present invention is not boehmite. For example, the XRD pattern of boehmite has a reflection at about 14.5 degrees two-theta, which is not present in the XRD pattern of the material of the present invention. Also, the XRD pattern of boehmite does not have a reflection at 18.5 degrees two-theta.

FIG. 5 shows that, even after calcination at 400° C. for 6 hours, the material of the present invention still has a relatively high level of crystallinity.

EXAMPLES

Example 1

Figure 1:
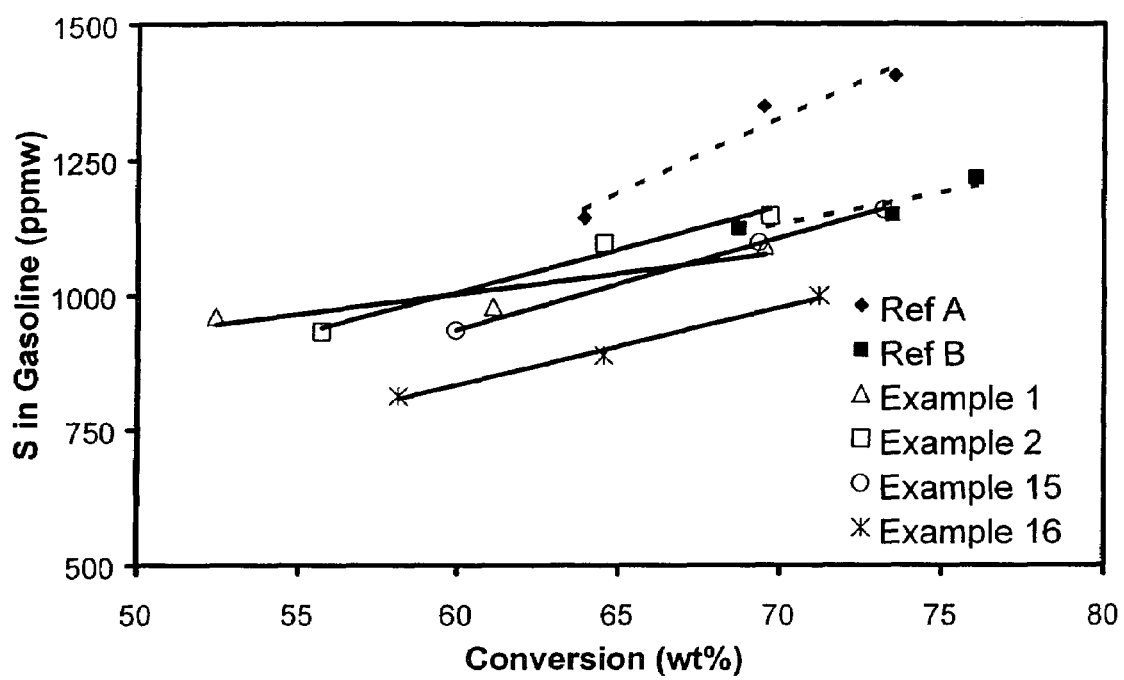
FIG. 1 displays the sulphur concentration in FCC gasoline versus the hydrocarbon conversion for different cationic layered materials and two reference samples.
Figure 2A:
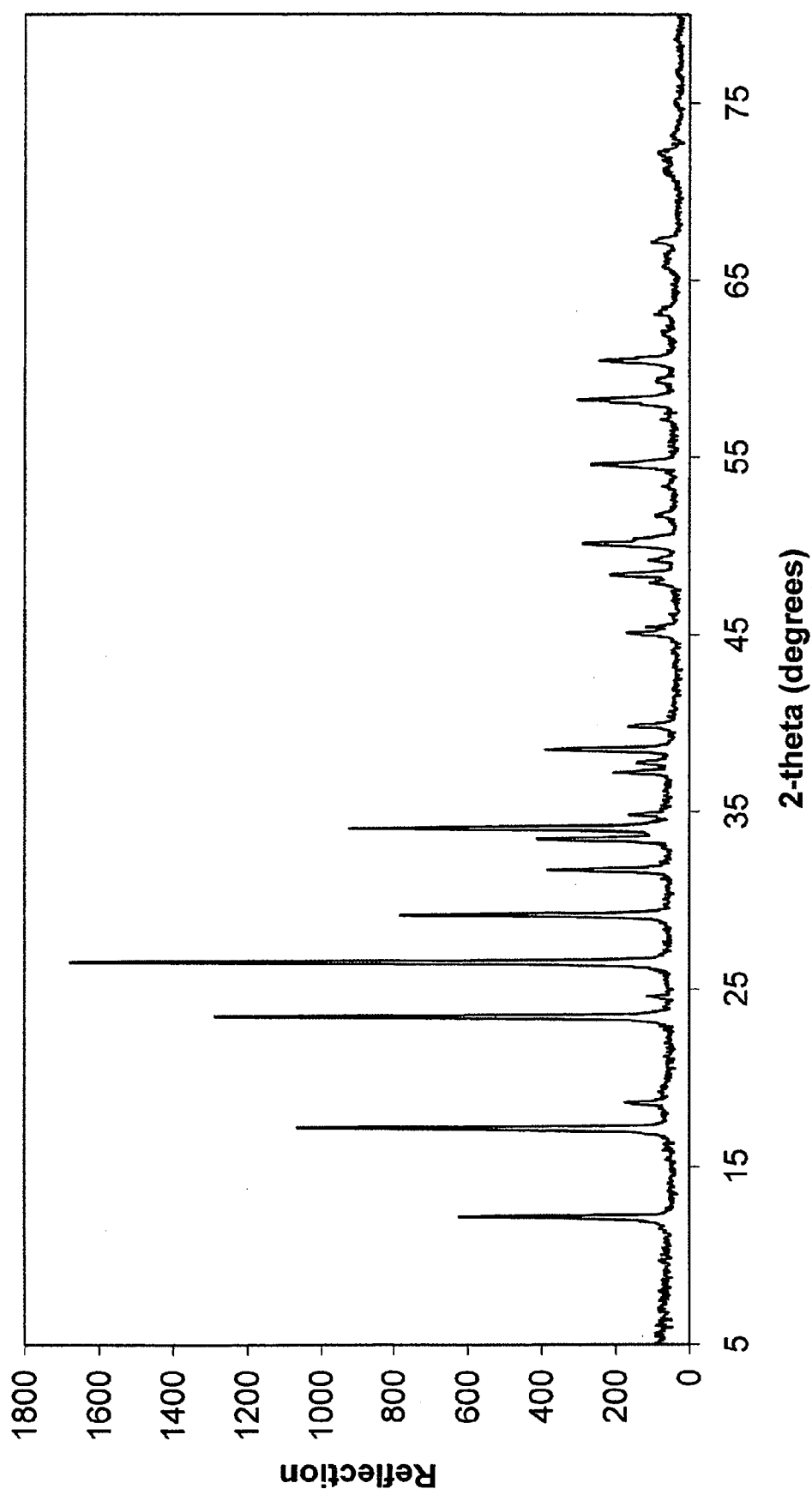
FIG. 2a shows the XRD pattern of a pure CLM material.
Figure 2B:
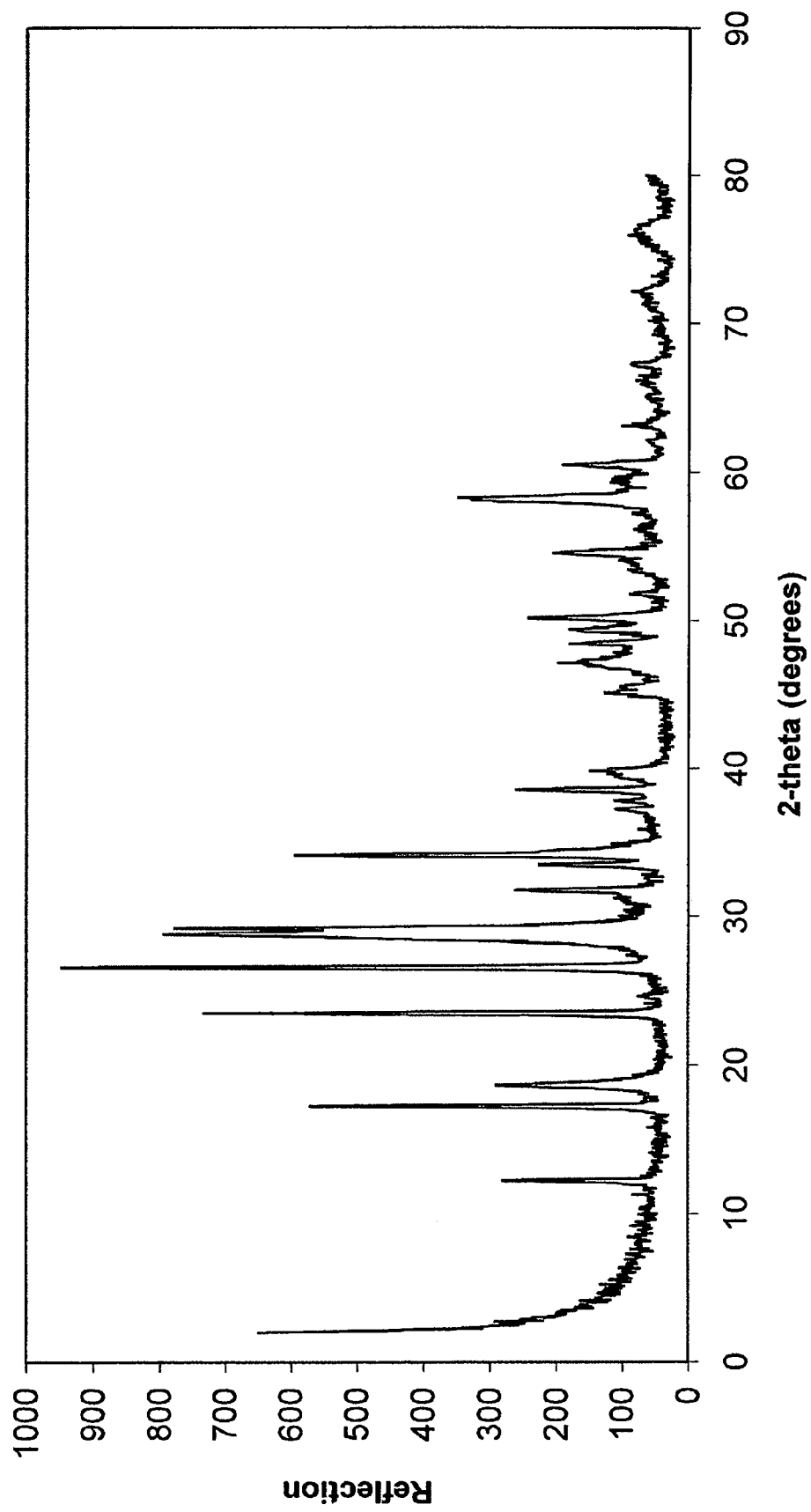
FIG. 2b shows the XRD pattern of a material according to the present invention.
Figure 3B:
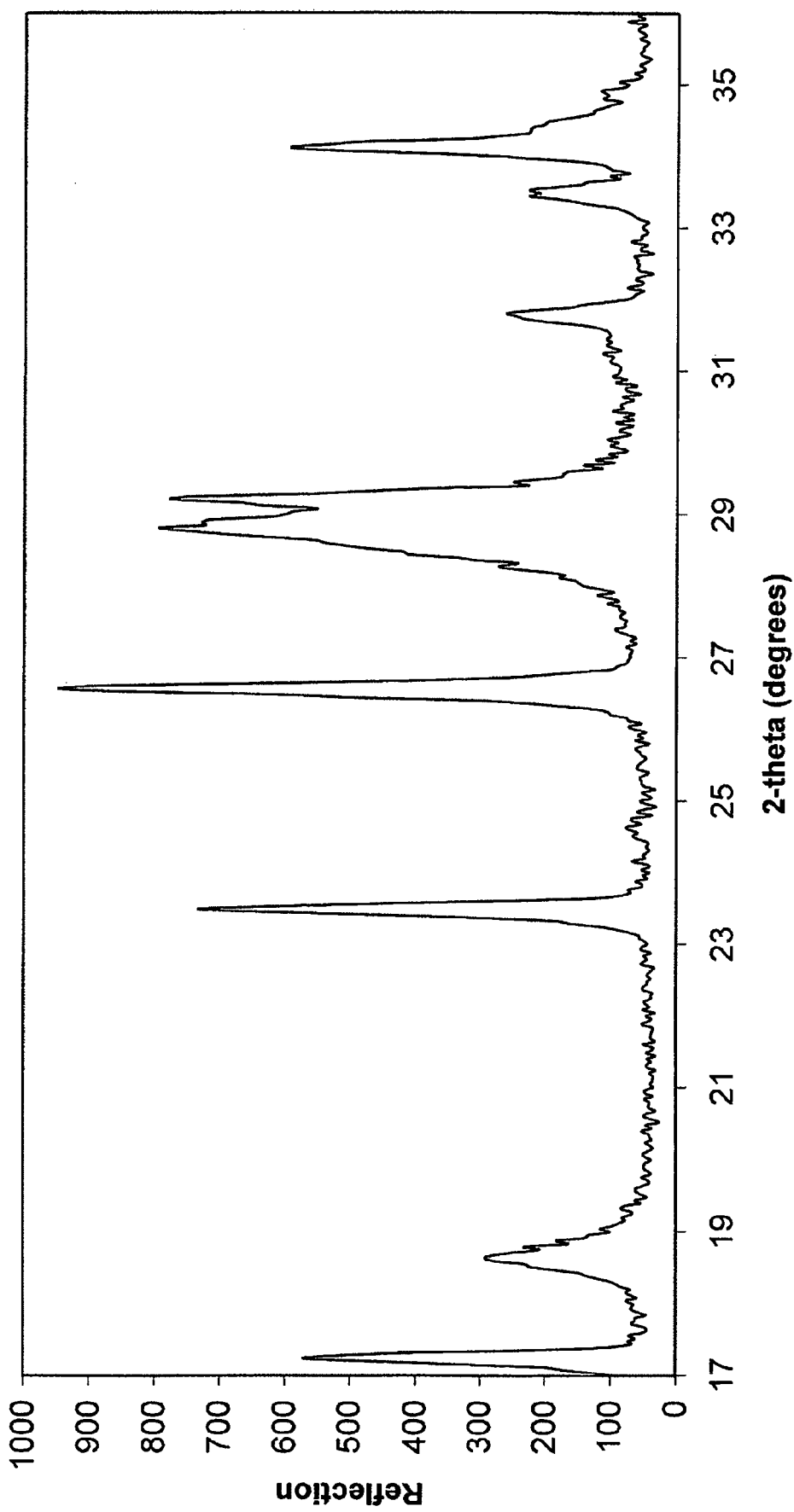
FIG. 3b shows an expansion of the XRD pattern of FIG. 2b in the range of 17 to 37° 2-theta.
Figure 4:
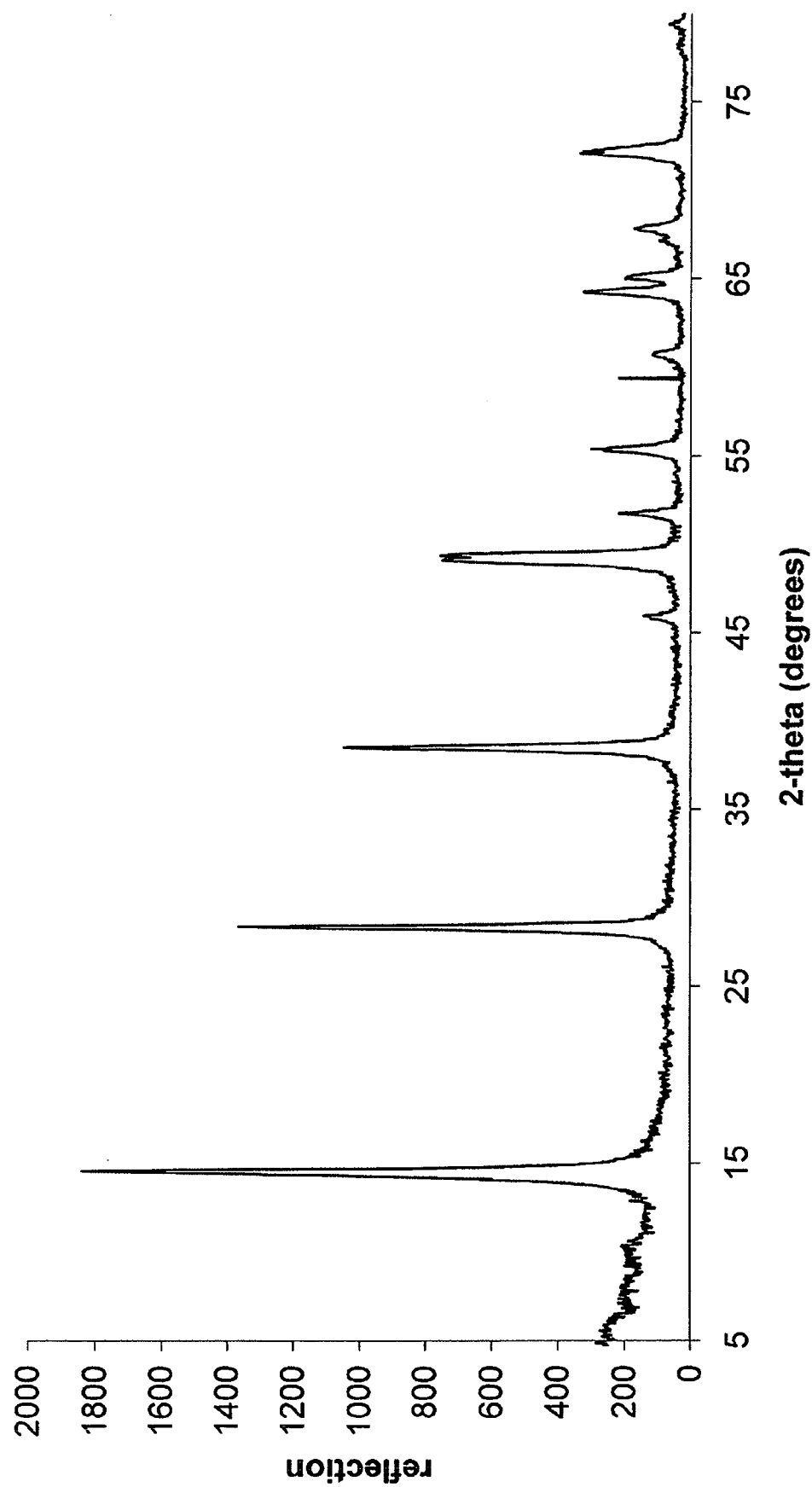
FIG. 4 shows the XRD pattern of a boehmite material.
Figure 5:
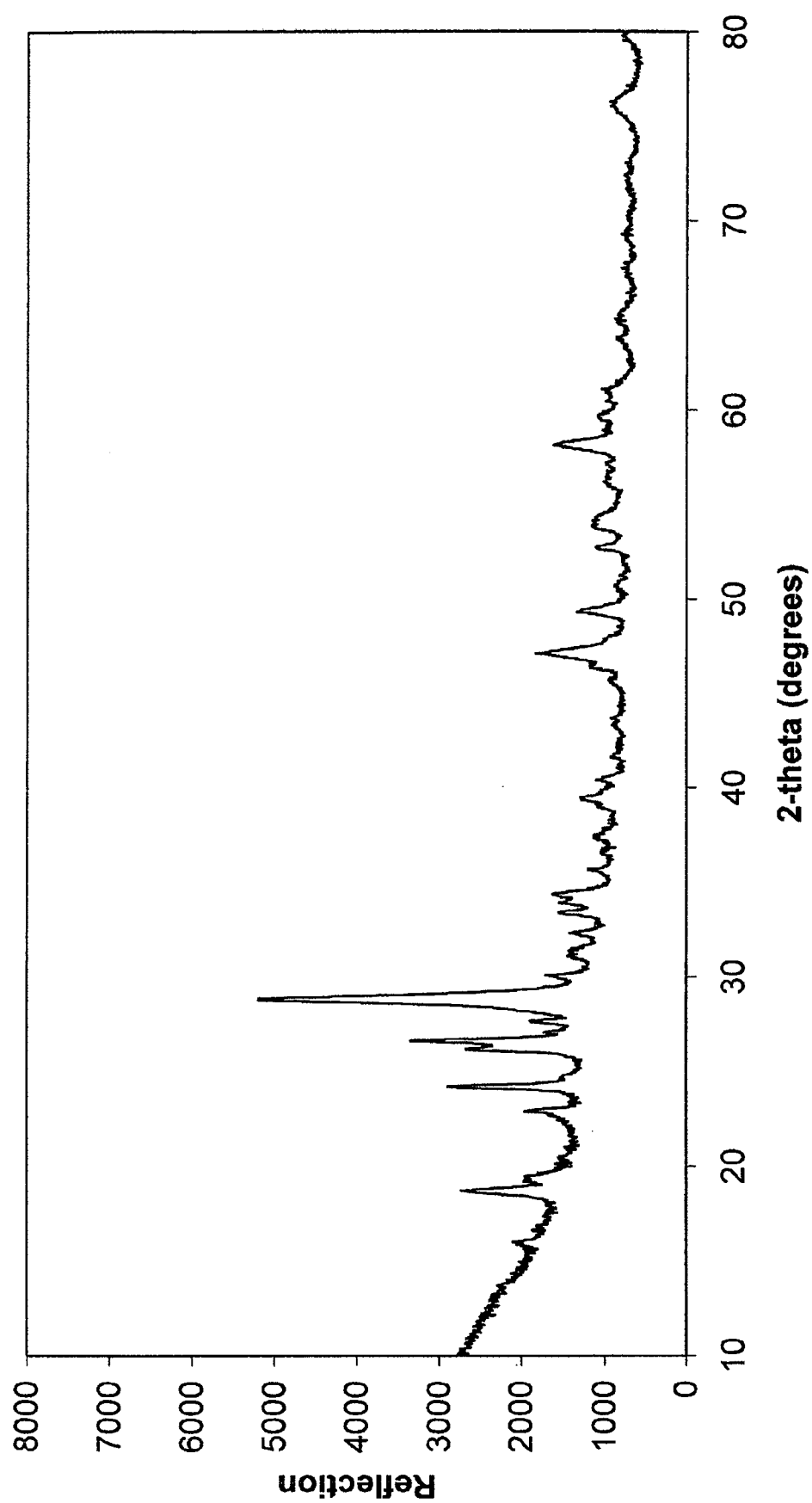
FIG. 5 shows the XRD pattern of the product of the present invention that has been calcined at 400° C. for 6 hours.

A mixture of 15.3 g gibbsite and basic zinc carbonate, $ZnCO_3.2ZnO.H_2O$, (Zn/Al atomic ratio of 3:1) was slurried in 130 ml of water. The slurry was milled. The resulting slurry was dried and subsequently calcined at 500° C. for 4 hours. The material (10 g) was then heated to 85° C. and aged overnight, while stirring in an aqueous solution (550 ml) of 0.042 M ammonium heptamolybdate. The product was filtered and washed. According to the powder X-ray diffraction pattern, the product contained a cationic layered material structurally identical to that reported by M. P. Astier et al.

Elemental analysis using SEM-EDAX showed the Zn/Al molar ratio in the product to be 1.25. Hence, the product was a composition comprising CLM and an aluminium-containing compound.

Example 2

Zn-doped pseudoboehmite was prepared by treating flash calcined gibbsite (42.5 g) for 2 hours in an aqueous solution of zinc nitrate (10 wt. % $Zn^{2+}$) at 120° C., pH 4 (pH adjustment with $HNO_3$). The solids content of the slurry was 20 wt %. This Zn-doped pseudoboehmite (172 g) was then mixed with basic zinc carbonate (sufficient for reaching a Zn/Al atomic ratio of 2), slurried in water (final solids content 22%), and milled. The slurry was dried and subsequently calcined at 500° C. for 4 hours. The calcined product (10 g) was aged overnight, while stirring in 550 ml of a 0.092 M solution of ammonium heptamolybdate at 85° C. The resulting material was filtered, washed, and dried at 85° C. overnight. According to the powder X-ray diffraction pattern, the product contained a cationic layered material structurally identical to that reported by M. P. Astier et al.

Example 3

A mixture of 15.3 g gibbsite, basic nickel carbonate, and zinc hydroxy carbonate was slurried in 285 ml of water. The atomic ratio (Zn+Ni):Al was 3:1, whereas the Ni:Zn ratio was 1:1. The slurry was milled. The resulting slurry was dried and subsequently calcined at 500° C. for 4 hours. The calcined material (10 g) was then heated to 85° C. and aged overnight, while stirring in an aqueous solution (550 ml) of 0.042 M ammonium heptamolybdate. The product was filtered and washed. According to the powder X-ray diffraction pattern, the product contained a cationic layered material structurally identical to that reported by M. P. Astier et al.

Example 4

A mixture of 21.3 g Chattem™ amorphous gel alumina and 11.8 g basic zinc carbonate (Zn:Al atomic ratio 3.0) was slurried in water (solids content 19 wt %) and subsequently calcined at 500° C. for 4 hours in air in a muffle furnace. Of the resulting product, 62.9 g was rehydrated in 1657 ml 1M sodium carbonate at 70° C. for 3 days while stirring. The PXRD pattern confirmed the formation of a Zn—Al anionic clay with a small amount of ZnO.

The so-prepared Zn—Al anionic clay was calcined at 400° C. for 4 hours in air. The calcined product (10 g) was slurried in 550 ml of a 0.042 M ammonium heptamolybdate solution while stirring. The mixture was heated and then mixed with the calcined Zn—Al anionic clay. The resulting slurry was left under stirring overnight at 85° C. and was subsequently filtered, washed with de-ionised water, and dried overnight at 100° C. According to the powder X-ray diffraction pattern, the product contained a cationic layered material structurally identical to that reported by M. P. Astier et al.

Example 5

A mixture of 15.3 g gibbsite and basic copper carbonate (Cu:Al atomic ratio of 3:1) was slurried in 140 ml of water. The slurry was milled. The resulting slurry was dried and subsequently calcined at 550° C. for 4 hours. The calcined material then heated to 85° C. and aged overnight, while stirring in an aqueous solution (550 ml) of 0.042 M ammonium heptamolybdate. The product was filtered and washed. According to the powder X-ray diffraction pattern, the product contained a cationic layered material structurally identical to that reported by M. P. Astier et al. Elemental analysis using SEM-EDAX showed the overall Cu/Al molar ratio in the bulk of the product to be 2. Hence, the product was a composition comprising CLM and an aluminium-containing compound.

Example 6

A mixture of 10.6 g flash calcined gibbsite (Alcoa CP® alumina) and 73.7 g basic zinc carbonate (Zn:Al ratio of 3:1) was slurried in water (solids content 18.3 wt %). The resulting slurry was dried at 100° C. and subsequently calcined at 300° C. for 4 hours in air in a muffle furnace. Of the resulting product, 55.4 g was rehydrated in 2770 ml 1 M sodium carbonate at 70° C. for 3 days while stirring. The product was filtered, washed and dried at 100° C. The PXRD pattern confirmed the formation of a Zn—Al anionic clay with a small amount of ZnO.

The so-prepared Zn—Al anionic clay was calcined at 500° C. for 3 hours in air. To 15.0 g or the calcined product was added 150 ml of a 0.3 M ammonium heptamolybdate solution. The mixture was heated to 85° C. and aged overnight. The product was filtered and washed with de-ionised water, and dried overnight at 100° C. According to the powder X-ray diffraction pattern, the product contained a cationic layered material structurally identical to that reported by M. P. Astier et al.

Example 7

A mixture of 22.9 g gibbsite and basic zinc carbonate (Zn:Al ratio of 3:1) was slurried in 335 ml of water. The slurry was milled. The resulting slurry was dried and subsequently calcined at 500° C. for 4 hours. After calcination, the product was rehydrated in a 1M $Na_2CO_3$ solution at 65° C. for 8 hours. This anionic clay was calcined at 400° C. for 4 hours.

The calcined product (10 g) was then aged overnight at room temperature, while stirring in an aqueous solution (550 ml) of 0.042 M ammonium heptamolybdate. The product was directly dried at 100° C. According to the powder X-ray diffraction pattern, the product contained a cationic layered material structurally identical to that reported by M. P. Astier et al.

Example 8

A mixture of 15.3 g gibbsite and basic zinc carbonate, $ZnCO_3 \cdot 2ZnO \cdot H_2O$, (Zn/Al atomic ratio of 3:1) and 12 wt % cerium nitrate—calculated as $CeO_2$ and based on total dry product weight—was slurried in 250 ml of water. The slurry was milled. The resulting slurry was dried and subsequently calcined at 500° C. for 4 hours. The material (10 g) was then heated to 85° C. and aged overnight, while stirring in an aqueous solution (550 ml) of 0.042 M ammonium heptamolybdate. The product was filtered, washed with de-ionised water, and dried overnight at 100° C. The resulting product was a Ce-containing cationic layered material.

Example 9

A mixture of 15.3 g gibbsite and basic zinc carbonate, $ZnCO_3 \cdot 2ZnO \cdot H_2O$, (Zn/Al atomic ratio of 3:1) and 4 wt % ammonium metavanadate—calculated as $V_2O_5$ and based on total dry product weight—(from; the % based on total dry weight of $Al_2O_3$ and ZnO) was slurried in 250 ml of water. The slurry was milled. The resulting slurry was dried and subsequently calcined at 500° C. for 4 hours. The material (10 g) was then heated to 85° C. and aged overnight, while stirring in an aqueous solution (550 ml) of 0.042 M ammonium heptamolybdate. The product was filtered, washed with de-ionised water, and dried overnight at 100° C. The resulting product was a V-containing cationic layered material.

Example 10

A mixture of 15.3 g gibbsite, basic zinc carbonate, $ZnCO_3 \cdot 2ZnO \cdot H_2O$, (Zn/Al atomic ratio of 3:1), 12 wt % cerium nitrate, and 4 wt % ammonium metavanadate—both calculated as oxides and based on total dry product weight—was slurried in 300 ml of water. The slurry was milled. The resulting slurry was dried and subsequently calcined at 500° C. for 4 hours. The material (10 g) was then heated to 85° C. and aged overnight, while stirring in an aqueous solution (550 ml) of 0.042 M ammonium heptamolybdate. The product was filtered, washed with de-ionised water, and dried overnight at 100° C. The resulting product was a Ce and V-containing cationic layered material.

Example 11

A mixture of 15.3 g gibbsite and basic zinc carbonate, $ZnCO_3 \cdot 2ZnO \cdot H_2O$, (Zn/Al atomic ratio of 3:1) was slurried in 130 ml of water. The slurry was milled. The resulting slurry was dried and subsequently calcined at 500° C. for 4 hours. The material (10 g) was then heated to 85° C. and aged overnight, while stirring in an aqueous solution (550 ml) of 0.042 M ammonium heptamolybdate. The product was filtered, washed with de-ionised water, and dried overnight at 100° C. This product was slurried in a 150 ml solution containing 12 wt % cerium nitrate—calculated as $CeO_2$ and based on dry product weight. The resulting slurry was dried at 100° C. The final product was a cerium-impregnated CLM.

Example 12

A mixture of 15.3 g gibbsite and basic zinc carbonate, $ZnCO_3 \cdot 2ZnO \cdot H_2O$, (Zn/Al atomic ratio of 3:1) was slurried in 130 ml of water. The slurry was milled. The resulting slurry was dried and subsequently calcined at 500° C. for 4 hours. The material (10 g) was then heated to 85° C. and aged overnight, while stirring in an aqueous solution (550 ml) of 0.042 M ammonium heptamolybdate. The product was filtered, washed with de-ionised water, and dried overnight at 100° C. This product was slurried in 150 ml of a solution containing 4 wt % ammonium metavanadate—calculated as $V_2O_5$ and based dry product weight. The resulting slurry was dried at 100° C. The final product was a vanadium-impregnated CLM.

Example 13

A mixture of 15.3 g gibbsite and basic zinc carbonate, $ZnCO_3 \cdot 2ZnO \cdot H_2O$, (Zn/Al atomic ratio of 3:1) was slurried in 130 ml of water. The slurry was milled. The resulting slurry was dried and subsequently calcined at 500° C. for 4 hours. The material (10 g) was then heated to 85° C. and aged overnight, while stirring in an aqueous solution (550 ml) of 0.042 M ammonium heptamolybdate. The product was filtered, washed with de-ionised water, and dried overnight at 100° C. This product was slurried in a 150 ml solution containing 12 wt % cerium nitrate and 150 ml of a solution containing 4 wt % ammonium metavanadate—both calculated as oxides and based on dry product weight. The resulting slurry was dried at 100° C. The final product was a cerium and vanadium-impregnated CLM.

Example 14

A mixture of 19.9 g gibbsite, basic nickel carbonate, and zinc hydroxy carbonate was slurried in 200 ml of water. The ratio (Zn+Ni):Al ratio of 3:1, whereas the Ni:Zn ratio was 3:7. The slurry was milled. The resulting slurry was dried and subsequently calcined at 550° C. for 4 hours. The calcined product (10.0 g) was heated to 85° C. and aged overnight, while stirring in an aqueous solution (550 ml) of 0.042 M ammonium heptamolybdate. The product was filtered and washed.

According to the powder X-ray diffraction pattern, the product contained a cationic layered material structurally identical to that reported by M. P. Astier et al. Elemental analysis using SEM-EDAX showed the presence of aluminium compounds in the product.

Example 15

A mixture of 15.3 g gibbsite, basic copper basic carbonate, and zinc hydroxy carbonate was slurried in 285 ml of water. The atomic ratio (Zn+Cu):Al was 3:1, whereas the Zn:Cu ratio was 1:1. The slurry was milled. The resulting slurry was dried and subsequently calcined at 500° C. for 4 hours. The calcined material (15 g) was then heated to 85° C. and aged overnight, while stirring in an aqueous solution (150 ml) of 0.3 M ammonium heptamolybdate. The product was filtered, washed with de-ionised water, and dried overnight at 100° C. According to the powder X-ray diffraction pattern, the product contained a cationic layered material structurally identical to that reported by M. P. Astier et al.

Example 16

A mixture of 2.0 g gibbsite and basic zinc carbonate, $ZnCO_3 \cdot 2ZnO \cdot H_2O$, (Zn/Al atomic ratio of 10:1) was slurried in 160 ml of water. The slurry was milled. The resulting slurry was dried and subsequently calcined at 500° C. for 4 hours. The material (15 g) was then heated to 85° C. and aged overnight, while stirring in an aqueous solution (150 ml) of 0.3 M ammonium heptamolybdate. The product was filtered, washed with de-ionised water, and dried overnight at 100° C.

According to the powder X-ray diffraction pattern, the product contained a cationic layered material structurally identical to that reported by M. P. Astier et al.

Example 17

The products of Examples 1, 2, 7, and 14 were tested for their de-SOx ability in FCC processes using the thermographimetric test described in *Ind. Eng. Chem. Res.* Vol. 27 (1988) pp. 1356-1360. A standard commercial de-SOx additive (REF) was used as a reference.

30 mg of the product sample was heated under nitrogen at 700° C. for 30 minutes. Next, the nitrogen was replaced by a gas containing 0.32% $SO_2$, 2.0% $O_2$, and balance $N_2$ with a flow rate of 200 ml/min. After 30 minutes the $SO_2$-containing gas was replaced by nitrogen and the temperature was reduced to 650° C. After 15 minutes, nitrogen was replaced by pure $H_2$ and this condition was maintained for 20 minutes. This cycle was repeated 3 times. The sample's $SO_x$ uptake and its release during hydrogen treatment were measured as the sample's weight change (in %).

The SOx uptake and release during the third cycle are shown in Table I. This Table also displays the effectiveness ratio, which is defined as the ratio of $SO_x$ release over $SO_x$ uptake. The ideal effectiveness ratio is 1, which means that all the $SO_x$ that was taken up has been released again, leading to a longer catalyst life.

TABLE I

| Sample | SOx uptake (% weight increase) | SOx release (% weight decrease) | Effectiveness ratio |
|---|---|---|---|
| Example 1 | 3.06 | 2.37 | 0.77 |
| Example 2 | 2.75 | 2.00 | 0.73 |
| Example 7 | 2.09 | 1.04 | 0.50 |
| Example 14 | 4.46 | 3.69 | 0.83 |
| REF | 4.89 | 1.51 | 0.31 |

This table shows that the effectiveness ratios of the samples according to the invention are higher than that of a standard commercial de-SOx additive.

Example 18

The products of Examples 1, 2, 15, and 16 were tested for their ability to reduce the sulfur content of FCC gasoline.

The samples to be tested were calcined for 2 hours. The calcined samples were blended with a commercial FCC catalyst; the blend containing 20 wt % of the desired sample and 80 wt % of FCC catalyst.

The blends were tested in a fixed bed test unit (MST) using a regular FCC feed containing 2.9 wt % of sulfur and a cracking temperature of 550° C. The sulfur content of the gasoline was measured at three different catalyst to oil ratios: 2.5, 3.5, and 4.5.

Two reference samples were tested:

Sample ref A: 100% of a standard E-cat

Sample ref B: a blend containing 20 wt % of a commercial FCC additive for the reduction of S in gasoline.

FIG. 1 displays the S content of the gasoline versus the conversion for the tested samples at the three catalyst to oil ratios. It is clear that cationic layered materials are able to reduce the sulfur content of gasoline.

Example 19

The products of Examples 3, 5, 7, and 15 were tested for their de-NOx ability in FCC processes. These samples showed good de-NOx properties.

The invention claimed is:

1. A composition of matter comprising a cationic layered material and a second compound having, in its XRD pattern, a reflection at about 29 degrees two-theta.

2. A composition of matter comprising a cationic layered material and a second compound having, in its XRD pattern, a reflection at about 18.5 degrees two-theta.

3. A composition of matter according to claim 2 wherein the second compound has, in its XRD pattern, a second reflection at about 29 degrees two-theta.

4. A composition of matter according to claim 3 wherein the second compound comprises aluminium.

5. The composition of matter of claim 4, comprising from about 1 about 50 wt % of the aluminium-containing compound.

6. The composition of matter of claim 4, comprising from about 5 to about 5 wt % of the aluminium-containing compound.

7. A hydrocarbon conversion, purification, or synthesis process comprising contacting a composition of matter with a hydrocarbon wherein said composition of matter comprises a cationic layered material and a second compound having, in its XRD pattern, a reflection at about 18.5 degrees two-theta.

8. The process according to claim 7 wherein said process is a hydrodesulfurisation, hydrodenitrogenation, fluid catalytic cracking, hydrogenation, or Fischer-Tropsch process.

9. The process according to claim 8 wherein said process reduces SOx and/or NOx emissions.

10. The process according to claim 8 wherein said process is a fluid catalytic cracking process wherein said composition of matter reduces the nitrogen and/or sulfur content of fuels like gasoline and/or diesel.

11. The process according to claim 7 wherein said process reduces SOx and/or NOx emissions.

* * * * *